O. A. HECKEL.
NUT LOCK.
APPLICATION FILED FEB. 10, 1912.
1,093,050.
Patented Apr. 14, 1914.
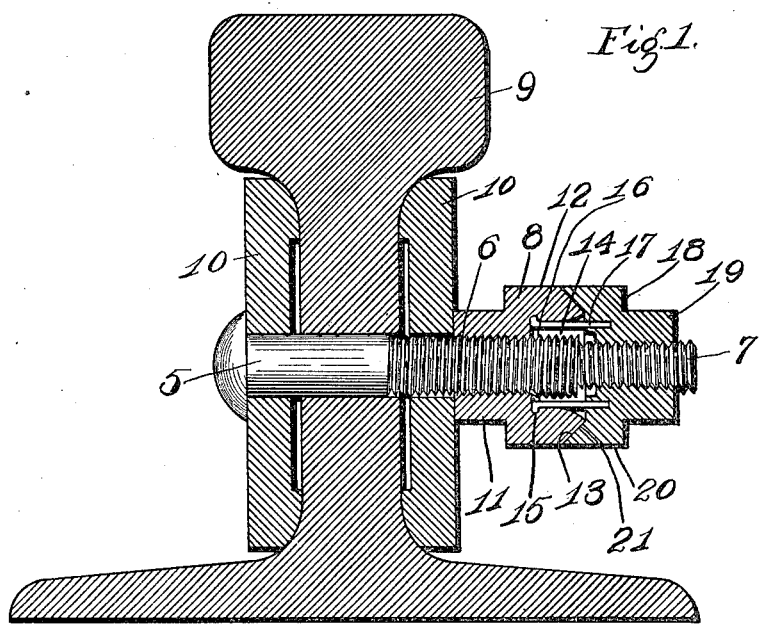
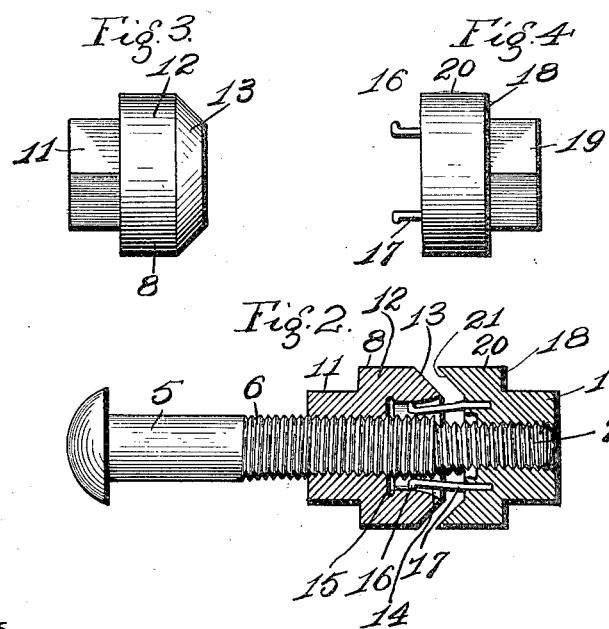
Witnesses
W. C. Stein
M. G. Lindsay
Inventor
Otto A. Heckel
by Alfred A. Eicks Atty.

UNITED STATES PATENT OFFICE.

OTTO A. HECKEL, OF ST. LOUIS, MISSOURI.

NUT-LOCK.

1,093,050. Specification of Letters Patent. Patented Apr. 14, 1914.

Application filed February 10, 1912. Serial No. 676,857.

*To all whom it may concern:*

Be it known that I, OTTO A. HECKEL, a citizen of the United States, and resident of St. Louis, Missouri, have invented certain new and useful Improvements in Nut-Locks, of which the following is a specification.

This invention relates to improvements in nut locks and has for its object to provide one end of a bolt, with a left hand and a right hand screw-thread over which is applied nuts having internal screw-threads corresponding to the thread over which the same is applied, one of said nuts having fastening members whereby the nuts when properly applied are thoroughly locked and prevented from becoming loosened or unscrewed by vibration.

A further object is to provide a nut lock so arranged as to be thoroughly secured and prevented from unscrewing by vibration but which may be removed by means of the ordinary wrenches used for applying and tightening the nuts.

Figure 1 is a vertical sectional view of my invention shown in position as applied to fish plates and railroad rails. Fig. 2 is a detail sectional view showing the two nuts in a position ready to be applied one to the other. Fig. 3 is a side elevation of the inner nut. Fig. 4 is a side elevation of the outer nut to which the locking device is attached.

In carrying out my invention I provide a suitable bolt 5 provided with a left hand screw-threaded portion 6 and a right hand screw-threaded portion 7, the portion having the right hand screw-threads being of smaller diameter than that portion provided with the left hand screw-threads so that the nut 8 provided with the left hand screw-threads can be readily applied without in any manner interfering with the right hand screw-threads. This bolt as shown in Fig. 1 is applied to ordinary railway rails 9 as indicated, securing the adjoining ends of the rails together by the use of the fish plates 10, but this nut lock can be used for any purpose for which such devices are desirable so as to avoid the loosening of operating parts and prevent the nuts and bolts from coming out of place.

The nut 8 as shown in this construction is provided with a shank 11 having flattened or rectangular surfaces either of square, hexagon, or octagon nut type so that a wrench can be readily applied for thoroughly tightening the nut upon the bolt and against the object the bolt is supposed to support; radiating from this shank is an enlarged portion 12 preferably of circular shape, its outer front surface being beveled as indicated by the numeral 13 and the same is provided with a recess 14 of larger diameter than the screw-threaded portion; the walls of the recess being somewhat curvilinear in form, the base of said recess having a groove or depression 15 in which is designed to be seated the ends or locking points 16 of fastening devices 17 carried by the outer nut 18; these fastening devices are preferably constructed of spring material and are firmly and securely seated in the nut and when brought in relative position the ends snugly fit into the depression or recess 15 as clearly shown in Fig. 1, preventing the outer nut 18 from turning on the thread portion and becoming disconnected from the inner nut. The outer nut to which these fastening devices are firmly attached is also provided with a shank 19 of a surface similar in construction to the shank 11 of the inner nut so as to be easily applied by the use of a wrench; this nut also having an enlarged circular portion 20 and suitably beveled as indicated by the numeral 21, but opposite to that of the beveled surface 13 of the inner nut, the position of the two bevels being such that when the nuts are applied the beveled surfaces will contact and register with each other making an absolute leak proof connection thereby preventing water or any foreign substance from passing in between the nuts and lodging within the recess.

The position of the locking devices when applying or removing the nuts is clearly shown in Fig. 2; these devices being of spring material and the curvilinear surface of the recess of the inner nut has a tendency to permit the contact points of the fastening devices to ride over the curvilinear surface and when in proper contact will lodge within the depression as shown in Fig. 1 frictionally holding the outer nut from jolting loose and on account of the left and right hand screw-threads it will be impossible for the nuts to become loosened and removed by means of the vibration or general wear upon the rail, but still permitting the nuts to be additionally tightened in the event the bolts should stretch by the pounding of the car-wheels over the joints in the track and can also be removed by means of a wrench first applied to the outer nut and during such action the fastening devices will release themselves from their locked position within the recess and ride upon the curvilinear surface, and when released will assume their straight position on account of the spring material.

Having fully described my invention what I claim is:

1. A nut lock comprising a bolt a portion thereof being of smaller diameter, the larger portion of the bolt provided with a left hand screw thread and the smaller portion with a right hand screw thread, a nut provided with an internal left hand screw thread, its one face beveled and provided with an internal recess, a second nut having an internal right hand screw thread and provided with a beveled recess which is to communicate with the beveled projection of the first nut, and a pair of fastening devices supported in the second nut, the free ends of the fastening devices arranged to seat themselves in the recess of the first nut for firmly locking the nuts in position when tightly screwed together substantially as specified.

2. A device of the class described comprising a bolt having left and right hand screw threads, the right hand screw thread being of smaller diameter than the left hand screw thread, a nut operating on the right hand screw thread, a nut operating on the left hand screw thread, the nut on the left hand screw thread having its one face tapered and a groove formed in its interior, the nut on the right hand screw thread having an inclined recess to receive the tapered portion of the left hand screw threaded nut and a pair of hook fastening devices firmly held in the right hand screw threaded nut, the free ends arranged to be seated in the groove when the nuts are tightly screwed together, substantially as specified.

3. A device of the class described comprising a nut lock consisting of a bolt, a pair of nuts, a right and left hand thread formed on said bolt, a nut operating on each of the threads, each of said nuts having a tapered contacting surface and an internal frictional fastening device connecting both nuts for preventing the two from turning simultaneously upon the bolt, substantially as specified.

In testimony whereof, I have signed my name to this specification, in presence of two subscribing witnesses.

OTTO A. HECKEL.

Witnesses:
ALFRED A. EICKS,
WALTER C. STEIN.